United States Patent [19]

Hanaway

[11] 4,178,944
[45] Dec. 18, 1979

[54] TAILINGS RETURN FOR AN AXIAL FLOW COMBINE

[75] Inventor: Roger D. Hanaway, Blue Springs, Mo.

[73] Assignee: Allis-Chalmers Corporation, Milwaukee, Wis.

[21] Appl. No.: 841,212

[22] Filed: Oct. 11, 1977

[51] Int. Cl.$^2$ .............................................. A01F 7/00
[52] U.S. Cl. ................................................. 130/27 R
[58] Field of Search ............................. 56/14.5, 14.6; 130/27 R

[56] References Cited

U.S. PATENT DOCUMENTS

| 1,837,906 | 12/1931 | Herl | 130/27 R |
| 2,507,669 | 5/1950 | Heth | 56/13.3 |
| 2,705,961 | 4/1955 | Worrell et al. | 130/27 R |
| 3,411,274 | 11/1968 | Jarvis | 56/14.6 |

*Primary Examiner*—Russell R. Kinsey
*Attorney, Agent, or Firm*—Charles L. Schwab

[57] ABSTRACT

Grain and other small particles are separated from the stalks in a transverse cage and cylinder of an axial flow combine and pass through the concave and small radial openings in the cage. Distribution augers below the cage convey the threshed material to a pair of accelerator rolls, by way of a feeder slot, which accelerate the threshed material downwardly across a layer of rearwardly directed air. The grain is separated from the chaff in the cleaning section where clean grain auger delivers the clean grain to an appropriate elevator which in turn delivers the grain to a grain bin. The heavy material or tailings which does not pass through the sieves, such as grain or seed not completely removed from the hulls or pods, moves to a tailings auger which connects to a tailings elevator. The tailings elevator moves the tailings upwardly to one end of one of the distribution augers. The tailings are conveyed to the accelerator rolls by the distribution auger by way of the accelerator rolls feeder slot thus avoiding a second pass through the threshing cylinder and the attendant cracking of seed or grain.

11 Claims, 5 Drawing Figures

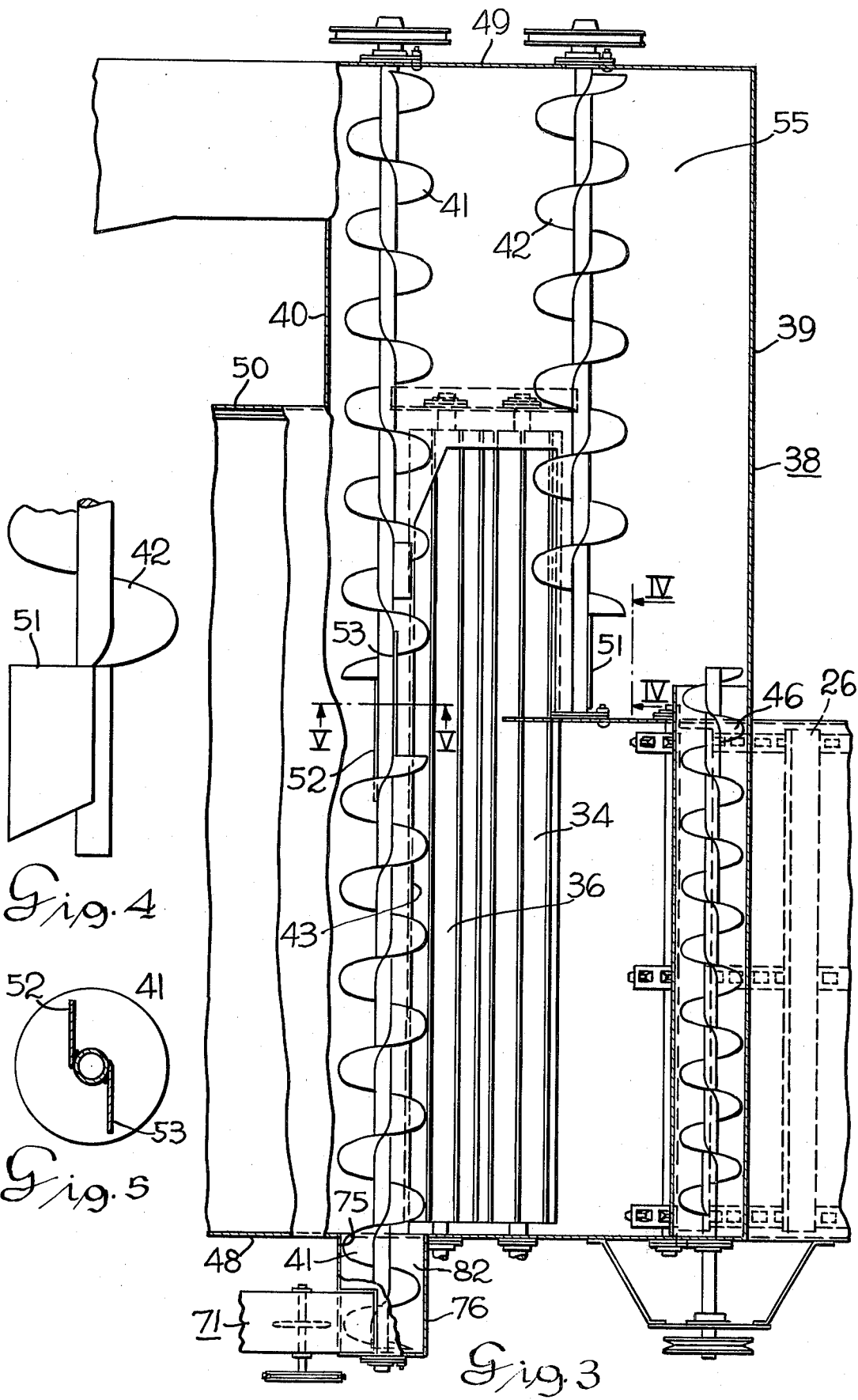

TAILINGS RETURN FOR AN AXIAL FLOW COMBINE

BACKGROUND OF THE INVENTION

Heretofore it has been a common practice to return the tailings to the threshing cylinder of a combine. In copending U.S. patent application Ser. No. 809,408 filed June 22, 1977, and now abandoned, J. Lyle Shaver, Distribution Augers for an Axial Flow Combine, the tailings return is shown directed to the interior of a housing around a cylinder and cage of an axial flow combine. The tailings are discharged toward the perforated cage and thus a substantial portion of the tailings pass through the small radial openings in the cage and into contact with the rasp bars of the rotating threshing cylinder. This threshing action on the tailings by the threshing cylinder results in undesirable cracking of the grain kernels or seeds.

BRIEF DESCRIPTION OF THE INVENTION

The tailings of an axial flow combine are returned to a distribution auger which distributed threshed material passing through the cylinder cage to a feeder slot directly above a pair of accelerator rolls. Thus the tailings do not pass through the threshing cylinder, thereby avoiding cracking of the kernels or seeds which would otherwise occur by impact with the rasp bars of the threshing cylinder.

BRIEF DESCRIPTION OF THE DRAWINGS

FIG. 3 is a horizontal section view of the combine taken along the line III—III in FIG. 1;

FIG. 4 is a section view taken along the line IV—IV in FIG. 3; and

FIG. 5 is a section view taken along the line V—V in FIG. 3.

DETAILED DESCRIPTION OF THE DRAWINGS

Figure 1:
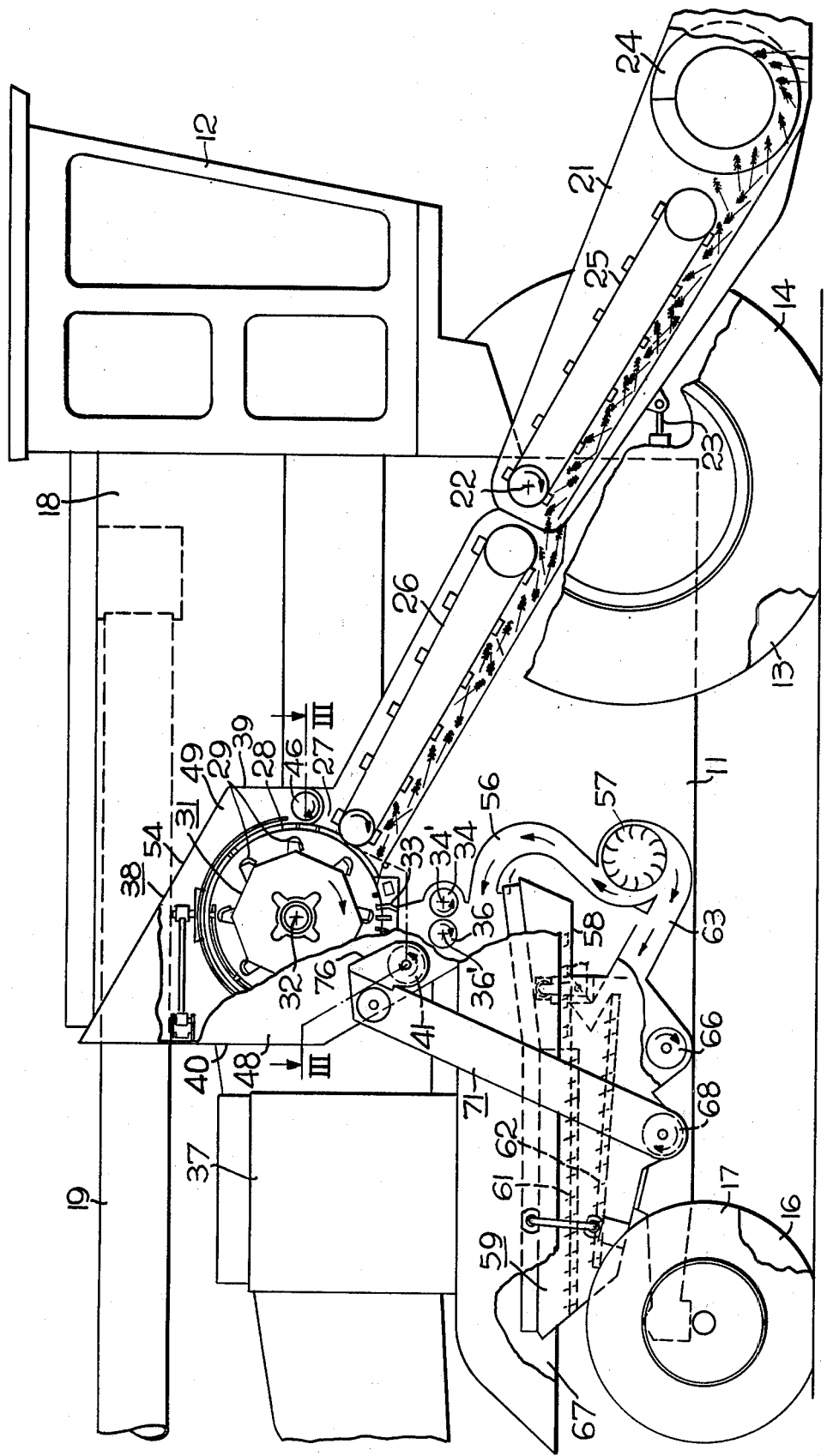
FIG. 1 is a side view of an axial flow combine in which the present invention is incorporated with parts broken away for illustration purposes.

Referring to FIG. 1, the combine includes a main frame 11, an operator's compartment 12 at the front end of the main frame, a power unit 37, a pair of traction wheels 13, 14 and a pair of rear steerable wheels 16, 17. A grain bin 18 is located directly behind the operator's compartment which may be unloaded by a swing-out unloading tube 19. a header unit 21 is mounted on the front of the combine for up and down swinging movement about a pivot axis 22 in response to expansion and contraction of a hydraulic actuator 23. The header unit includes cutter means, not shown, for severing the crop from the ground, an auger 24 with oppositely pitched flights which conveys the cut material to a central position on the header and a slat conveyor 25 which moves the cut crop material rearwardly where it is discharged to a second slt conveyor 26. The second slat conveyor 26 conveys the cut material to the threshing section of the combine by way of relatively large radial opening 27 in a foraminous cage 28. The cut material passing into the cage 28 is engaged by a plurality of rasp bars 29 secured to a threshing cylinder 31. The threshing cylinder 31 and its cage 28 are disposed on a transverse, horizontal axis 32. The stationary cage 28 includes a concave 33 adjacent one axial end which is disposed above a pair of accelerator rolls 34, 36 disposed on parallel and longitudinally spaced transverse axes 34', 36'.

Referring also to FIG. 3, the threshing section of the combine includes a housing 38 having front and rear walls 39, 40, vertical laterally spaced and longitudinally extending side walls 48, 49, a top wall 54 and a bottom wall 55. Thethreshing section also includes the cage 28, the cylinder 31 and distribution augers 41, 42 and 46. It should also be understood that the power unit 37 drives the drive wheels 13, 14 and the various moving parts of the combine through appropriate power trains (not shown).

Some threshed material passing through the concave and the sieve-like cylindrical wall of the cage falls downwardly to a discharge opening or slot 43 in the bottom wall 55 of the housing 38, and some threshed material falls to the lower distribution augers 41, 42 and to the overfeed distribution auger 46. The distribution augers serve to move the threshed material to the discharge opening or feeder slot 43 in the bottom 55 of the housing 38 disposed directly above the y accelerator rolls 34, 36. The overfeed auger 46 conveys the threshed material passing through the forward side of the cage directly aove the upper end of the slat feeder 26 laterally inward to a central portion of the housing 38 where it falls by gravity down a sloping lower section of wall 39 to the paddle 51 of auger 42 which sweeps the material into slot 43. For a more complete showing and description of the distribution augers 41, 42, 46, reference may be made to the copending patent application Ser. No. 809,408 referred to in the Background of the Invention statement of this application. It should be understood that the cage 28 and the coaxial threshing cylinder extend transversely from the vertical sidewall 48 to the vertical sidewall 49 of the housing 38 whereas the cleaning section of the combine extends a lesser transverse distance, namely between the side wall 48 and a vertical side wall 50. The accelerator rolls 34, 36 are substantially the same transverse dimension as the cleaning section.

FIGS. 4 and 5 are sections taken along the lines IV—IV and V—V in FIG. 3 showing a paddle 51 secured to the auger 42 and a pair of oppositely extending paddles 52, 53 secured to auger 41. The auger flights and paddles are so designed as to help effect even distribution of threshed material to the accelerator rolls by way of the transversely extending feeder slot 43.

Threshed material accelerated downwardly by the accelerator rolls 34, 36 is intercepted by a rearwardly directed layer of air emitted from a duct or conduit 56 connected to a transverse flow blower 57. The air from the blower 57 blows the light chaff particles rearwardly from the commingled grain or seed and out a discharge opening 67. The grain or seed passes downwardly to the grain pan 58 and thence rearwardly to upper and lower sieves 61, 62 of the longitudinally reciprocating shoe assembly. The clean grain or seed separated from the chaff by the shoe assembly passes to a clean grain auger 66 and the relatively heavy material which does not pass through the sieves 61, 62, and which is not blown out the rear opening 67 of the combine by air supplied by the blower through conduits 56 and 63, slides and falls to a tailings auger 68 disposed rearwardly of the clean grain auger 66. The lower end of a tailings elevator 71 is connected in tailings receiving relation to the discharge end of the tailings auger 68.

Figure 2:
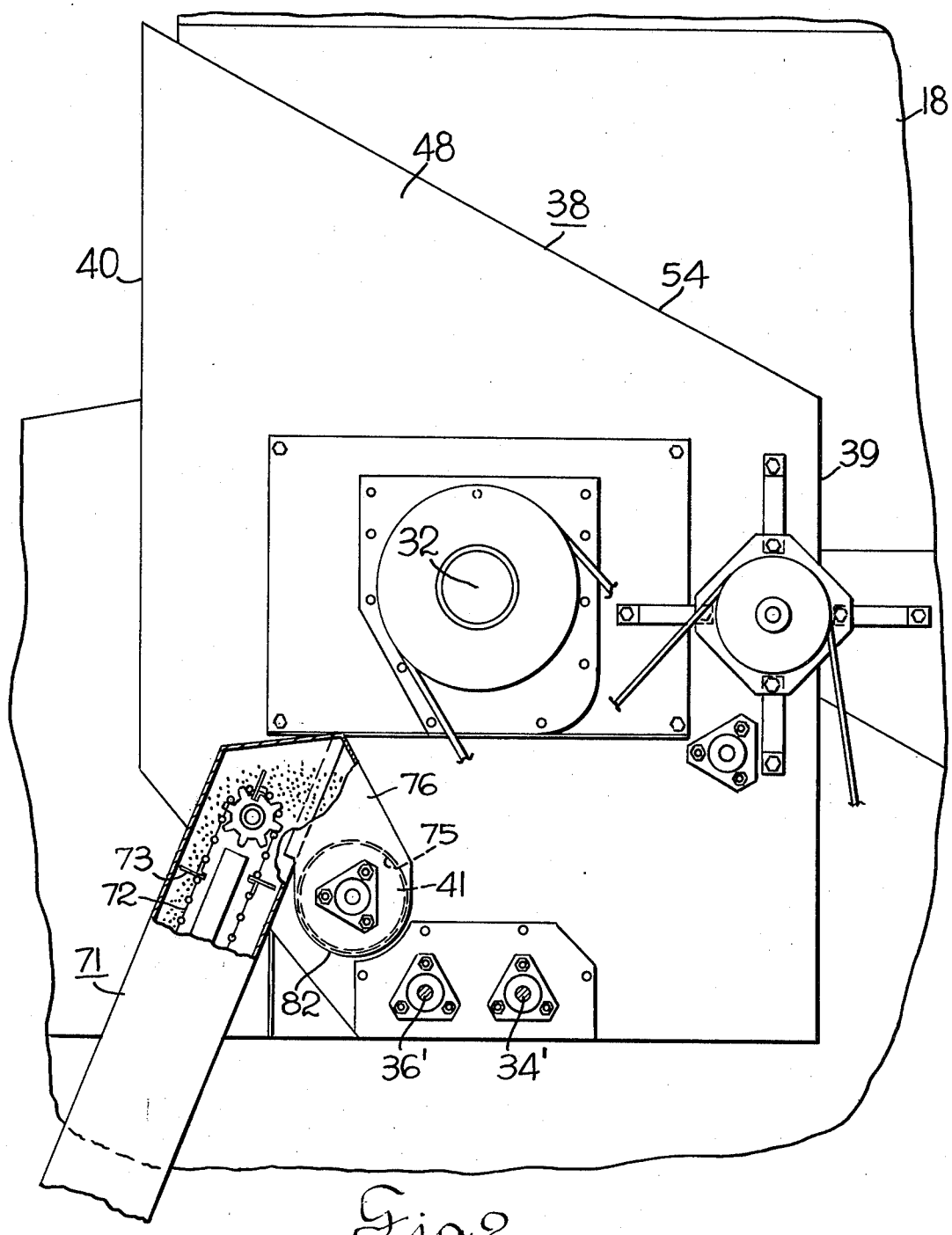
FIG. 2 is a partial side view of the combine shown in FIG. 1 showing the connection of the tailings elevator with a distribution auger.

As shown in FIG. 2, the tailings return elevator 71 includes an endless chain 72 on which transverse paddles 73 are mounted. The tailings, which include hulls or pods containing kernels of grain or seed, are conveyed to the top of the tailings elevator 71 and discharged at the upper end thereof through a transfer case 76 to the outboard end of the distribution auger 41.

As shown in FIG. 3, the outboard end of the distribution auger 41 extends laterally outwardly through an opening 75 in the sidewall 48 into the transfer case 76, which includes a lower cylindrical part 82 coaxial with the auger 41 and in operative cooperation therewith. The transfer case 76 is secured to the sidewall 48 of the threshing section housing 38.

During operation of the combine, the unthreshed pods or head segments of the harvested crop will not pass through the sieves 61 and 62 and hence will find their way to the tailings auger 68 and tailings return elevator 71. The tailings return elevator 71 delivers the tailings to the distribution auger 41 which in turn conveys the tailings to the feeder slot 43. Tailings falling through the feeder slot pass between the accelerator rolls 34, 36 which accelerate the tailings downwardly through the airstream from the conduit 56. By this process, a substantial quantity of the seed contained in the tailings is separated from the hulls or pods without having such material come into contact with the rasp bars 29 of the threshing cylinder 31. By so routing the return of the tailings through only the accelerator and cleaning section of the combine, the cracking of the seeds which would otherwise occur upon their being contacted by the rotating cylinder 31 is avoided. It should be understood that, in the illustrated embodiment of the invention, the cleaning section of the combine includes the shoe assembly 59, the blower 57, conduits 56, 63 and the transversely extending tailings auger 68.

The embodiments of the invention in which an exclusive property or privilege is claimed are defined as follows:

1. In an axial flow combine for harvesting seed, the combination comprising:
   a threshing section including
      a housing having walls including a pair of lateral spaced vertical sidewalls extending in the longitudinal direction of the combine and a transversely extending discharge opening permitting discharge of threshed material from the threshing section,
      a foraminous cylindrical cage extending between said sidewalls,
      a threshing cylinder disposed within said cage, said cage and cylinder being disposed on a horizontal axis disposed transverse to the direction of travel of said combine, and
      a transversely disposed distribution auger in said housing for conveying some of the threshed material passing through said cage to said discharge opening,
   a cleaning section receiving threshed material discharged from said threshing section by way of said discharge opening, said cleaning section including means or separating light particles and tailings from the seed and
   a tailings elevator connected at its lower end to said cleaning section to receive said tailings and having its upper end disposed in delivery relation to said distribution auger.

2. The combine defined in claim 1 wherein said housing includes a bottom wall and wherein said discharge opening is a transverse slot in said bottom wall.

3. The combine defined in claim 2 wherein said distribution auger is disposed at the bottom of said housing.

4. the combine defined in claim 1 wherein one of said sidewalls includes an opening and one end of said distribution auger extends through said opening and wherein the upper end of said tailings elevator is disposed in delivery relation to said one end of said distribution auger.

5. The combine defined in claim 1 and further comprising a transfer case secured to a wall of said housing in operative association with said distribution auger and wherein the upper end of said tailings elevator is connected to said transfer case so as to deliver tailings thereto.

6. In an axial flow combine for harvesting seed, the combination comprising:
   a threshing section including
      a housing having walls including a pair of lateral spaced vertical sidewalls extending in the longitudinal direction of the combine and a bottom wall having a transverse feeder slot extending transversely a distance less than the distance between said sidewalls, said slot permitting discharge of threshed material from the threshing section,
      a foraminous cylindrical cage extending between said sidewalls,
      a threshing cylinder disposed within said cage, said cage and cylinder being disposed on a horizontal axis disposed transverse to the direction of travel of said combine, and
      a distribution auger disposed in said housing adjacent the bottom thereof on a transverse horizontal axis for conveying some of the threshed material passing through said cage to said slot and having one end adjacent to one of said sidewalls,
   a cleaning section receiving threshed material discharged from said threshing section by way of said slot, said cleaning section including means for separating light particles and tailings from the seed and
   a tailings elevator connected at its lower end to said cleaning section to receive said tailings and having its upper end disposed in delivery relation to said one end of said distribution auger.

7. The combine defined in claim 6 wherein said one of said sidewalls includes an opening and said one end of said distribution auger extends through said opening.

8. The combine defined in claim 7 and further comprising a transfer case secured to said one wall of said housing in operative association with said one end of said distribution auger and wherein the upper end of said tailings elevator is connected to said transfer case so as to deliver tailings thereto.

9. The combine defined in claim 8 wherein said transfer case includes a cylindrical portion into which said one end of said distribution auger extends.

10. The combine defined in claim 6 and further comprising a pair of accelerator rolls disposed between said sections on longitudinally spaced transverse axes below said slot for accelerating the threshed material downwardly to said cleaning section and means for directing air rearwardly through the threshed material accelerated downwardly by said accelerator rolls.

11. The combine of claim 6 wherein said cleaning section has a lateral width substantially the same as said distance.

* * * * *

UNITED STATES PATENT OFFICE
CERTIFICATE OF CORRECTION

Patent No. 4,178,944    Dated December 18, 1979

Inventor(s) Roger D. Hanaway

It is certified that error appears in the above-identified patent and that said Letters Patent are hereby corrected as shown below:

Column 3, line 64, "or" should read --- for ---.

Signed and Sealed this

Nineteenth Day of August 1980

[SEAL]

Attest:

SIDNEY A. DIAMOND

Attesting Officer    Commissioner of Patents and Trademarks